A. Fuller,
Faucet.
N° 13,677. Patented Oct. 16, 1855.
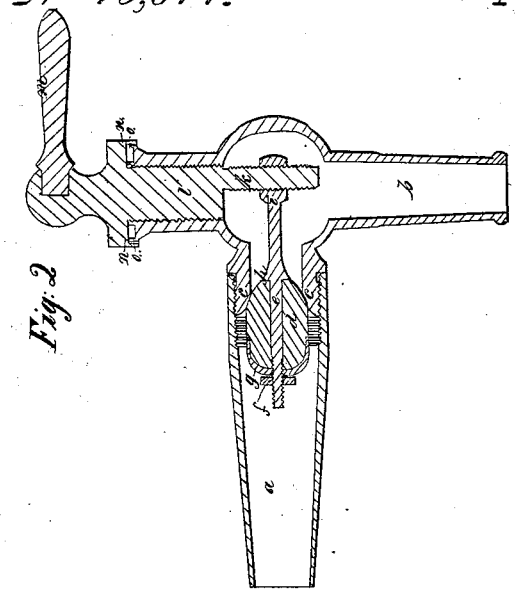
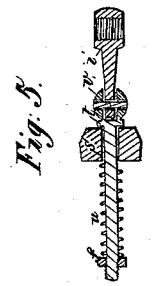
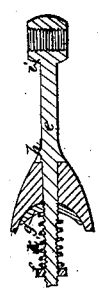
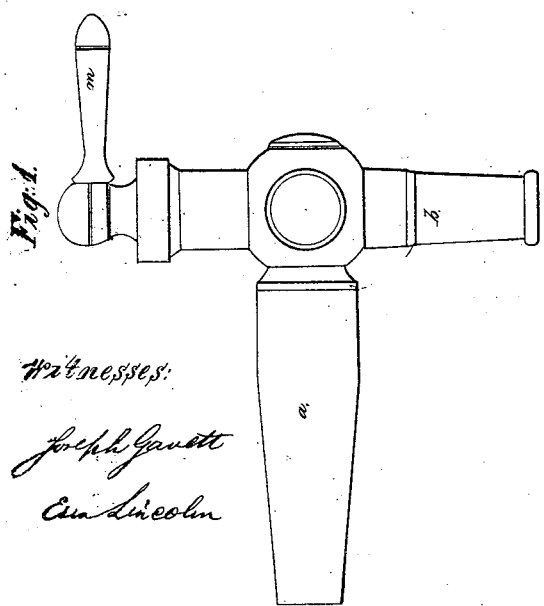
Witnesses:
Joseph Gavett
Ezra Lincoln
Inventor:
Albert Fuller

UNITED STATES PATENT OFFICE.

ALBERT FULLER, OF BOSTON, MASSACHUSETTS.

FAUCET.

Specification forming part of Letters Patent No. 13,677, dated October 16, 1855; Reissued July 5, 1859, No. 752.

*To all whom it may concern:*

Be it known that I, ALBERT FULLER, of Boston, in the county of Suffolk and State of Massachusetts, have invented certain new and useful Improvements in Faucets, and that the following description, taken in connection with the accompanying drawings, hereinafter referred to, forms a full and exact specification of the same, wherein I have set forth the nature and principles of my said improvements by which my invention may be distinguished from others of a similar class, together with such parts as I claim and desire to have secured to me by Letters Patent.

The figures of the accompanying plate of drawings represent my improvements.

Figure 1 is a side elevation of my improved faucet. Fig. 2 is a central vertical section of the same. Figs. 3, 4, and 5 represent modifications of my improvements to be hereinafter explained.

My improvements consist in providing for the accurate seating of the valve, in faucets in which the plug is moved by a crank, or other positive motion, by means independent of, and in addition to those by which the valve is moved back and forth, and in making the plug susceptible of adjustment, whereby it can be set up or adapted to its seat, whenever it becomes necessary, this part of my invention, comprising several modes of adjustment, to be hereinafter fully described, but all embodying the same general principles, and having the same object in view, viz. the setting up and readjustment of the valve or plug to its seat when it becomes worn.

*a a* in Figs. 1 and 2 represents the supply pipe of the faucet, and *b b* the delivering pipe of the same. The valve seat is formed in the supply pipe at *c c*. The valve is composed of a plug *d* of rubber or other elastic material, secured to the horizontal stem *e*, by means of a nut *f* working on a screw thread cut upon one end of the stem *e* and by a cap *g*.

By turning the nut *f*, it will be seen that the cap *g* will be forced against the rubber plug *d* and press it against the shoulder *h*, formed on the stem *e*, thereby causing the elastic plug to assume a more convex form than it previously had. By this means, when the valve becomes worn, the plug can be set up so as to insure a tight joint between it and its seat, by simply turning the nut *f*, without the necessity of removing the plug. The end of the valve stem most remote from the plug, is formed into an eye or nut *i*, in which is cut a female screw, and through this eye is inserted the short vertical rod *k*, with threads cut upon it to match those of the eye or nut *i*. The vertical rod *k* is cast or attached eccentrically to the end of the screw shaft *l*, that is turned by a handle *m*.

The number of threads to the inch upon the screw shaft *l*, is the same as that upon the vertical rod *k*, and when the handle *m* is turned, the plug *d* will, by means of the eccentrically placed rod *k*, acting upon the eye or nut *i*, either be drawn away from its seat, so as to permit a free delivery of the fluid, or be forced upon the said seat and prevent the passage of the fluid. As the vertical rod *k*, by means of its screw thread, travels in the screw of the eye or nut *i*, the unerring return of the valve to a perfectly horizontal position, and to its seat, is secured by a positive motion, the plug being slightly elevated while being pushed away from its seat, and returned exactly to its proper position when drawn back. The screw rod *k* traveling in the nut or eye of the valve stem, brings the valve stem and plug, when the plug is drawn upon its seat, into a horizontal position, and cannot carry them beyond such a horizontal position, as when the parts are thus situated, the cap or shoulder *n n* of the screw shaft *l* (which as before stated has the same number of threads to an inch as the vertical rod *k*) is brought down to its full bearing *o o*, and cannot be turned any farther.

It will be evident that there are a variety of modes in which the plug can be made adjustable, so as to be set up to its seat, as fast as it becomes worn, and some of the most obvious modifications of the devices hereinabove described for effecting this result, viz, the unerring seating of the valve, but embodying the same general principles, are represented in Figs. 3, 4 and 5 of the accompanying drawings, being longitudinal, vertical sections of the valve and valve stem.

In Fig. 3 a screw is cut upon the valve stem *e*, and in lieu of the shoulder *h* represented in Fig. 2 a nut is used, whereby the plug *d* can be compressed and made to assume a more convex form when necessary, by turning both the nuts $f$ and $p$ as will readily be understood by inspection of Fig. 3.

In Fig. 4 the plug is represented as hollowed out at its larger end with a cap $g$ conforming in shape to the shape of the chamber in the end of the plug. The cap $g$ is pressed upon by a spiral spring $r$, coiled around the valve stem $e$, which spring abuts against the nut $f$. Thus by turning up the nut $f$, the spiral spring $r$ will press upon the cup $g$ and thereby distend and enlarge the chambered end of the plug, the other end of the same having a bearing against the shoulder $h$.

In Fig. 5 metallic plug $s$ is loosely placed upon the valve stem, having a bearing against a shoulder $t$. A spiral spring $u$ presses against the plug $s$, being confined by the nut $f$ working upon the screw on the valve stem. By means of the nut $f$ the spring $u$ can be compressed, and made to press with greater force against the plug $s$, keeping it close upon its seat and insuring a tight joint. In this case the valve stem is jointed so as to turn freely upon the pivot $v$, and thereby insure its receiving a movement in a horizontal direction by the turning of the vertical screw rod $k$. By this arrangement, if by the drawing motion imparted to the valve stem, the plug did not find its proper seat, the spring $u$ by its elastic force would aid in pressing the plug upon its seat, independently of the positive motion received by the valve stem.

Having thus described my improvements I shall state my claims as follows:

What I claim as my invention and desire to have secured to me by Letters Patent is—

The use of the devices employed for insuring the accurate seating of the valve, when actuated by a crank, or other positive motion, the same consisting of the screw rod $k$, traveling in the female screw of the nut or eye formed on the valve stem, and being cut and constructed and arranged with regard to the screw shaft $l$, so as to operate with the same as desired whereby the valve and stem, when the plug is drawn upon its seat, are brought into the exact position required for enabling the valve to find its proper seat.

ALBERT FULLER.

Witnesses:
JOSEPH GAVETT,
EZRA LINCOLN.

[FIRST PRINTED 1912.]